Dec. 2, 1924.
F. KAYTE
HOLDER
Filed May 23, 1923
1,517,432
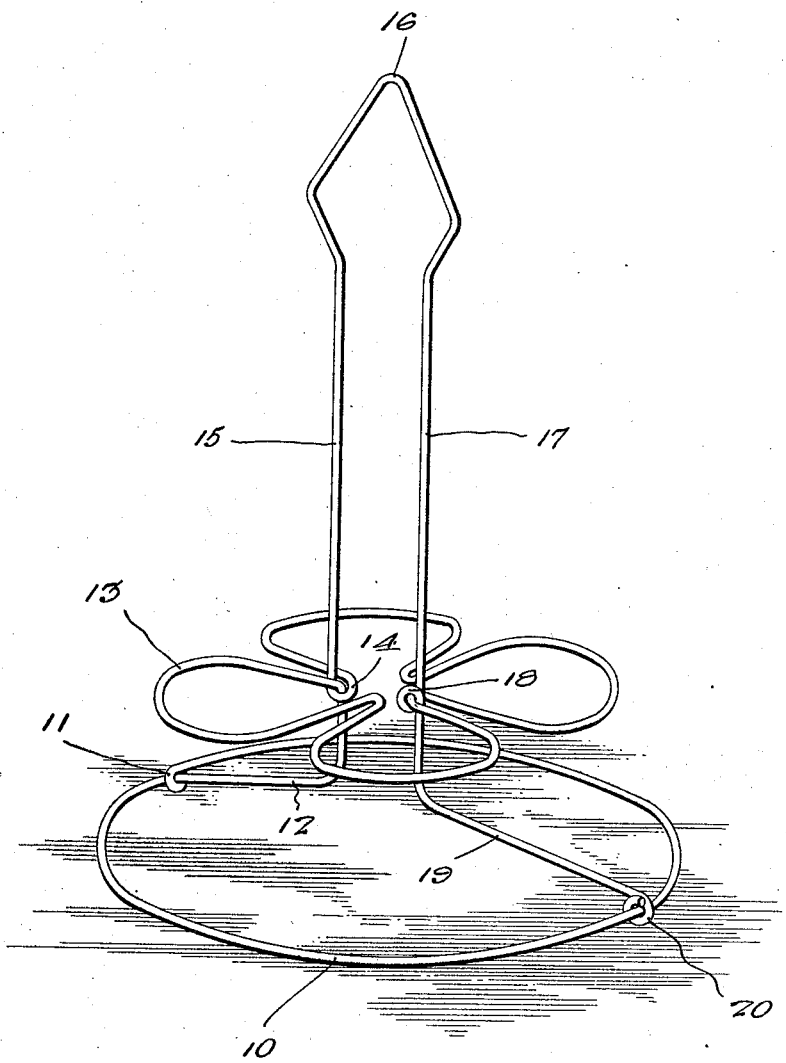
Frank Kayte
INVENTOR
BY Victor J. Evans
ATTORNEY Patented Dec. 2, 1924.

1,517,432

UNITED STATES PATENT OFFICE.

FRANK KAYTE, OF FARR, COLORADO.

HOLDER.

Application filed May 23, 1923. Serial No. 640,940.

*To all whom it may concern:*

Be it known that I, FRANK KAYTE, a citizen of the United States, residing at Farr, in the county of Huerfano and State of Colorado, have invented new and useful Improvements in Holders, of which the following is a specification.

This invention relates to holders especially designed for holding eggs, either during the process of cooking, or when serving, or both.

An object of the invention is the provision of an egg holder which is formed from a single length of wire and provides an exceedingly simple, cheap, sanitary and convenient device for the purposes above mentioned.

With the above and other objects in view, the invention further includes the following novel features and details of construction, to be hereinafter more fully described, illustrated in the accompanying drawing and pointed out in the appended claim.

In the drawing the figure shown is a perspective view of a holder constructed in accordance with the invention.

Referring in detail to the drawing wherein like characters of reference denote corresponding parts, the holder is shown as formed from a single length of wire and includes a base loop 10, one end of the wire being connected as shown at 11 to close the loop, while from this point of connection there extends an inwardly and upwardly disposed leg 12. The wire at the upper end of this leg is bent to provide a plurality of horizontally disposed loops 13 and one end of one of these loops is connected with an adjacent loop as shown at 14. From this point, the wire is extended upwardly to form one arm 15 of a handle, the upper end of which is looped as at 16 and is then extended downwardly to provide another arm 17 which is spaced from the first mentioned arm 15. The lower end of the arm 17 is secured between two of the loops 13 as shown at 18 so that a looped handle is provided, while extending from the point 18 downwardly and outwardly is a leg 19 whose outer end is connected to the base loop 10 as shown at 20.

The invention thus provides a holder which may be placed in a suitable container for the purpose of holding eggs while cooking and which thereafter may be used for the purpose of serving the eggs.

The invention is susceptible of various changes in its form, proportions and minor details of construction and the right is herein reserved to make such changes as properly fall within the scope of the appended claim.

Having described the invention what is claimed is:—

A holder formed from a single length of wire and comprising a loop, one end of the wire closing said loop, a leg extending upwardly from the loop and bent to provide a plurality of horizontally disposed loops each associating with an adjacent loop, said wire projecting upwardly forming one arm of a handle from whence it is contortioned and looped and extended downwardly with an arm spaced from and parallel to said first mentioned arm, the lower portion of the second mentioned arm secured between loops diametrically opposite the first mentioned arm whereby said handle is formed while extending from this point downwardly and outwardly is a leg whose outer end is connected to the base loop as and for the purpose specified.

In testimony whereof I affix my signature.

FRANK KAYTE.